(12) United States Patent
Gheorghiu et al.

(10) Patent No.: US 8,730,938 B2
(45) Date of Patent: May 20, 2014

(54) MINIMIZING THE IMPACT OF SELF SYNCHRONIZATION ON WIRELESS COMMUNICATION DEVICES

(75) Inventors: Valentin A. Gheorghiu, Tokyo (JP); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 12/755,288

(22) Filed: Apr. 6, 2010

(65) Prior Publication Data

US 2010/0260169 A1  Oct. 14, 2010

Related U.S. Application Data

(60) Provisional application No. 61/167,653, filed on Apr. 8, 2009.

(51) Int. Cl.
*H04J 3/06* (2006.01)

(52) U.S. Cl.
USPC .......................................... 370/350; 370/336

(58) Field of Classification Search
USPC ......... 370/328, 350, 312, 496, 336, 310, 314, 370/321, 324, 326; 455/205, 522, 422.1
See application file for complete search history.

(56) References Cited

U.S. PATENT DOCUMENTS

| | | | |
|---|---|---|---|
| 6,622,022 B1 | 9/2003 | Du | |
| 6,665,541 B1 | 12/2003 | Krasner et al. | |
| 6,708,041 B1 * | 3/2004 | Butovitsch et al. | 455/522 |
| 6,714,563 B1 | 3/2004 | Kushi | |
| 8,391,878 B2 | 3/2013 | Tenny | |
| 2001/0034238 A1 | 10/2001 | Voyer | |
| 2002/0186716 A1* | 12/2002 | Eidson | 370/503 |
| 2008/0144515 A1 | 6/2008 | Ouellette et al. | |
| 2008/0165761 A1 | 7/2008 | Goppner et al. | |
| 2008/0232344 A1 | 9/2008 | Basu et al. | |
| 2008/0240072 A1* | 10/2008 | Bykovnikov | 370/350 |
| 2009/0161638 A1* | 6/2009 | Mullen | 370/336 |
| 2009/0279529 A1* | 11/2009 | Hamalainen et al. | 370/350 |
| 2010/0054237 A1* | 3/2010 | Han et al. | 370/350 |
| 2010/0159861 A1* | 6/2010 | Becker et al. | 455/205 |
| 2010/0189038 A1* | 7/2010 | Chen et al. | 370/328 |

(Continued)

FOREIGN PATENT DOCUMENTS

| | | |
|---|---|---|
| EP | 1311077 A1 | 5/2003 |
| EP | 1041746 B1 | 8/2003 |

(Continued)

OTHER PUBLICATIONS

International Search Report and Written Opinion—PCT/US2010/030434, International Search Authority—European Patent Office—Aug. 19, 2010.

(Continued)

*Primary Examiner* — Jeffrey M Rutkowski
*Assistant Examiner* — Syed M Bokhari
(74) *Attorney, Agent, or Firm* — Ashish L. Patel

(57) ABSTRACT

A method for self synchronization by a base station is described. Network information is sent to a wireless communication device. The network information indicates a first time period. The first time period is a period of silence by the base station. Synchronization signals are monitored during the first time period. Monitoring synchronization signals includes not transmitting.

40 Claims, 14 Drawing Sheets

(56) References Cited

U.S. PATENT DOCUMENTS

| | | | |
|---|---|---|---|
| 2011/0149947 A1* | 6/2011 | Kim et al. | 370/350 |
| 2011/0275363 A1* | 11/2011 | Kwon et al. | 455/422.1 |
| 2012/0039232 A1* | 2/2012 | Kwon et al. | 370/312 |

FOREIGN PATENT DOCUMENTS

| | | |
|---|---|---|
| EP | 1355450 A1 | 10/2003 |
| EP | 1976165 A2 | 10/2008 |
| JP | 2000315978 A | 11/2000 |
| JP | 2006211016 A | 8/2006 |
| TW | 200814582 A | 3/2008 |
| TW | 200836508 A | 9/2008 |
| WO | 2007102749 A1 | 9/2007 |

OTHER PUBLICATIONS

Taiwan Search Report—TW099110939—TIPO—Apr. 25, 2013.
European Search Report—EP13168049—Search Authority—Munich—Jun. 14, 2013.
European Search Report—EP13168050—Search Authority—Munich—Jun. 18, 2013.

* cited by examiner

MINIMIZING THE IMPACT OF SELF SYNCHRONIZATION ON WIRELESS COMMUNICATION DEVICES

RELATED APPLICATIONS

This application is related to and claims priority from U.S. Provisional Patent Application Ser. No. 61/167,653, filed Apr. 8, 2009, for "Method And Apparatus For Minimizing User Equipment Impact with Self Synchronization."

TECHNICAL FIELD

The present disclosure relates generally to wireless communication systems. More specifically, the present disclosure relates to systems and methods for minimizing the impact of self synchronization on wireless communication devices.

BACKGROUND

Wireless communication systems have become an important means by which many people worldwide have come to communicate. A wireless communication system may provide communication for a number of mobile stations, each of which may be serviced by a base station.

Each of the base stations in a wireless communication system may operate synchronously. In other words, each of the base stations may synchronize clocks with the same source. By operating synchronously, improvements such as interference management may be achieved.

In addition to the wireless communication systems currently in place, a new class of small base stations has emerged. These small base stations may be installed in a user's home and provide indoor wireless coverage to mobile stations using existing broadband Internet connections. Typically, these miniature base stations are connected to the Internet and the mobile device's network via a Digital Subscriber Line (DSL) router or cable modem. Benefits may be realized by improved methods for synchronizing these miniature base stations.

DETAILED DESCRIPTION

Figure 1:
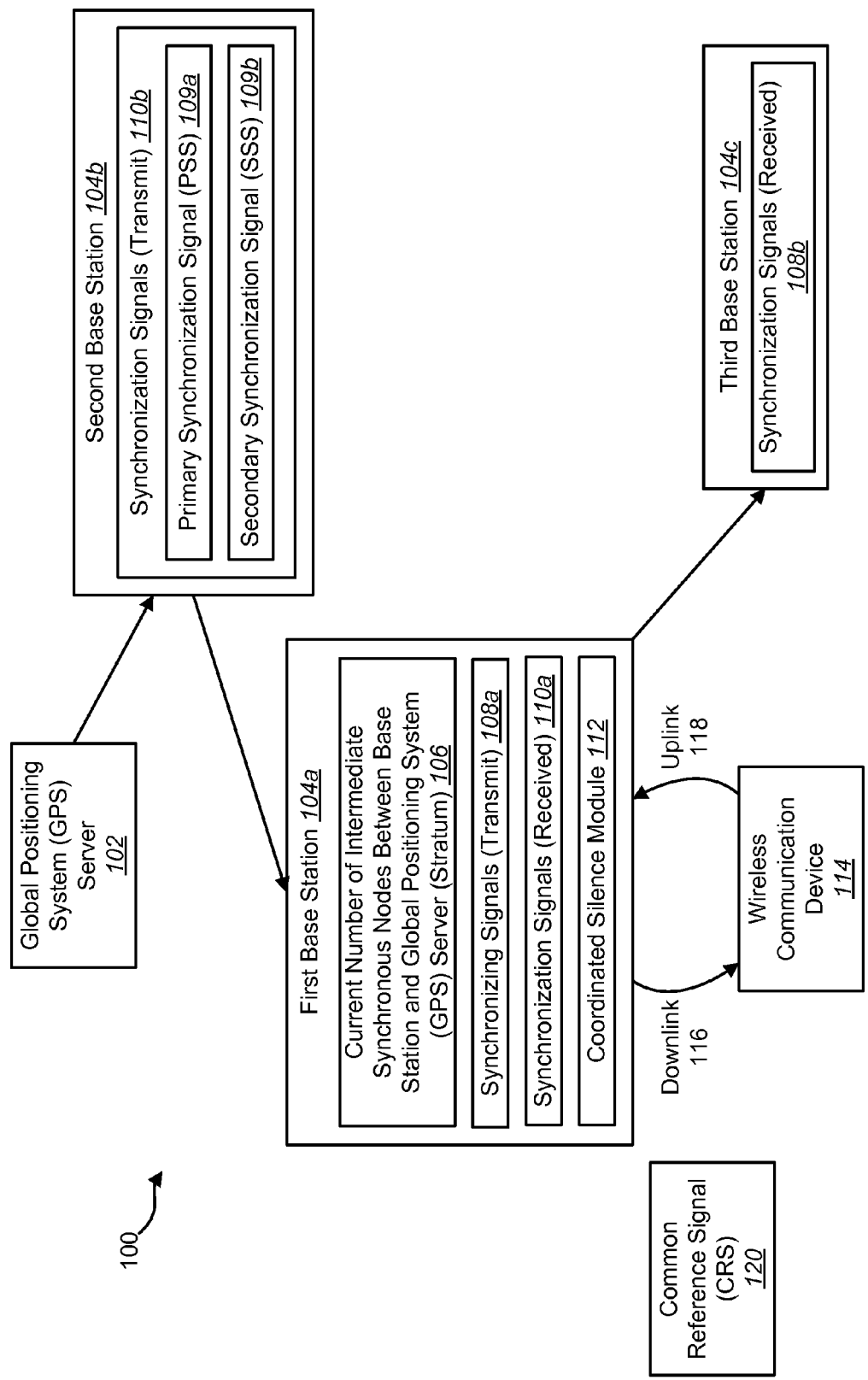
FIG. 1 shows a wireless communication system with multiple wireless devices.

A method for self synchronization by a base station is described. Network information is sent to a wireless communication device. The network information indicates a first time period that is a period of silence by the base station. Synchronization signals are monitored during the first time period. Monitoring synchronization signals includes not transmitting.

The base station may have a current stratum. Synchronization signals may be transmitted in a second time period that includes slots designated for base stations having a stratum less than or equal to the current stratum to transmit synchronization signals. The first time period may include slots designated for base stations having a stratum less than or equal to the current stratum to monitor synchronization signals. The network information may include a multimedia broadcast single frequency network (MBSFN) subframe declaration. A common reference signal (CRS) may be received from a synchronizing node. The base station may use the CRS for tracking.

A common reference signal (CRS) may be transmitted in subframes declared as MBSFN for a stratum greater the current stratum. The subframes declared as MBSFN may be part of a second time period. A common reference signal (CRS) may be tracked in subframes declared as MBSFN for a stratum less than or equal to the current stratum.

A synchronization signal may be searched for. It may be determined whether the synchronization signal has been acquired. A current stratum may be determined based on the synchronization signal if the synchronization signal has been acquired. The network information may include a message instructing the one or more wireless communication devices to enter a discontinuous receive (DRX) mode during the period of silence. The network information may also include a sleep time for the wireless communication device. The network information may identify one or more subframes when the base station performs self synchronization.

The network information may include a subframe index that implicitly indicates one or more subframes when the base station performs self synchronization. The synchronization signals may be sent by a synchronization source. Monitoring synchronization signals may include time-tracking a synchronization source. Frequency error correction may be performed while time-tracking the synchronization source.

Sending the network information may include gradually decreasing power and then gradually increasing the power to mimic a deep fade. The network information may include scheduling information that includes no scheduled transmissions to the wireless communication device in and around subframes where no common reference signal (CRS) is transmitted. Sending the network information may also include simultaneously transmitting a common reference signal (CRS) to the wireless communication device while achieving self synchronization using a Primary Synchronization Signal (PSS) on the last two orthogonal frequency division multiplexing (OFDM) symbols of a slot.

Sending the network information may further include simultaneously transmitting a common reference signal (CRS) to the wireless communication device while achieving self synchronization using a Secondary Synchronization Signal (SSS) on the last two orthogonal frequency division multiplexing (OFDM) symbols of a slot.

The base station may be a home evolved NodeB (HeNB). The wireless communication device may be legacy user equipment (UE). The period of silence may be coordinated by a network.

A wireless device configured for self synchronization is described. The wireless device includes a processor, memory in electronic communication with the processor, and instructions stored in the memory. The instructions are executable by the processor to send network information to a wireless communication device. The network information indicates a first time period that is a period of silence by the base station. The instructions are also executable by the processor to monitor synchronization signals during the first time period. Monitoring synchronization signals includes not transmitting.

A wireless device configured for self synchronization is also described. The wireless device includes means for sending network information to a wireless communication device. The network information indicates a first time period that is a period of silence by the base station. The wireless device also includes means for monitoring synchronization signals during the first time period. Monitoring synchronization signals includes not transmitting.

A computer-program product for self synchronization by a base station is described. The computer-program product includes a computer-readable medium having instructions thereon. The instructions include code for sending network information to a wireless communication device. The network information indicates a first time period that is a period of silence by the base station. The instructions also include code for monitoring synchronization signals during the first time period. Monitoring synchronization signals includes not transmitting.

The $3^{rd}$ Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

In 3GPP LTE, a mobile station or device may be referred to as a "user equipment" (UE). A base station may be referred to as an evolved NodeB (eNB). A semi-autonomous base station may be referred to as a home eNB (HeNB). An HeNB may thus be one example of an eNB. The HeNB and/or the coverage area of an HeNB may be referred to as a femtocell, a picocell, an HeNB cell or a closed subscriber group (CSG) cell.

FIG. 1 shows a wireless communication system 100 with multiple wireless devices. Wireless communication systems 100 are widely deployed to provide various types of communication content such as voice, data, and so on. These systems may be multiple-access systems capable of supporting communication with multiple users by sharing the available system resources (e.g., bandwidth and transmit power). A wireless device may be a base station 104 or a wireless communication device 114. A global positioning system (GPS) server 102 is also illustrated in FIG. 1.

A base station 104 is a station that communicates with one or more wireless communication devices 114. A base station 104 may also be referred to as, and may include some or all of the functionality of, an access point, a broadcast transmitter, a NodeB, an evolved NodeB, etc. The term "Base Station" will be used herein. Each base station 104 provides communication coverage for a particular geographic area. A base station 104 may provide communication coverage for one or more wireless communication devices 114. The term "cell" can refer to a base station 104 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity, or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, forward and reverse link transmissions are on the same frequency region so that the reciprocity principle allows the estimation of the forward link channel from the reverse link channel. This enables a transmitting wireless device to extract transmit beamforming gain from communications received by the transmitting wireless device.

The wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, Third Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA) systems utilize single carrier modulation and frequency domain equalization. An SC-FDMA system has similar performance and essentially the same overall complexity as those of an OFDMA system. An SC-FDMA signal has lower peak-to-average power ratio (PAPR) because of its inherent single carrier structure. SC-FDMA has drawn great attention, especially in uplink communications where lower peak to average power ratio (PAPR) greatly benefits the mobile terminal in terms of transmit power efficiency. It is currently a working assumption for uplink multiple access scheme in 3GPP Long Term Evolution (LTE), or Evolved UTRA.

Synchronization among base stations 104 in a wireless network brings many benefits such as interference management or virtual MIMO. Traditionally, cellular network synchronization is achieved using global positioning system (GPS) receivers collocated with base stations 104. GPS receivers and/or GPS signals may not always be available for synchronization purposes due to manufacturing cost consideration, power consumption limitations, the lack of line-of-sight to GPS satellites and other reasons. In such scenarios, alternative synchronization strategies may be necessary. One such scenario is the heterogeneous deployments used in LTE or LTE-A.

Less power base stations 104 such as home evolved NodeBs (HeNB), picocells and femtocells are used in addition to the normal base stations 104. A picocell may refer to a base station 104 controlled by the network operator that operates on a much smaller scale than normal base stations 104. A femtocell may refer to a base station 104 controlled by a consumer that operates on a much smaller scale than normal base stations 104. A femtocell may provide service to a closed subscriber group. A femtocell, picocell and HeNB may have similar transmit powers and coverage areas. A femtocell, picocell and HeNB may be placed indoors where they are unlikely to receive a GPS signal. Alternatively, a femtocell, picocell or HeNB may not even have a GPS receiver. A normal base station 104 may be referred to as a macro base station 104.

An unsynchronized base station 104 may derive synchronization from an already synchronized base station 104. Once a base station 104 has derived synchronization from an already synchronized base station 104, the newly synchronized base station 104 may continue to monitor synchronization signals transmitted by the already synchronized base station 104. For example, the first base station 104a may have derived synchronization from the second base station 104b. The first base station 104a may continue to monitor synchronization signals (transmit) 110b that are transmitted by the second base station 104b. The synchronization signals received by the first base station 104a from the second base station 104b may be referred to as synchronization signals (received) 110a. The first base station 104a may use the synchronization signals (received) 110a to derive synchronization.

The second base station 104b may be synchronized directly with a global positioning system (GPS) server 102. The second base station 104b may be referred to as a macro evolved NodeB. The second base station 104b may use a GPS receiver (not shown) to synchronize directly with the global positioning system (GPS) server 102.

The first base station 104a may also provide synchronization to a third base station 104b. The first base station 104a may transmit synchronization signals (transmit) 108a. Synchronization signals received by the third base station 104c from the first base station 104a may be referred to as synchronization signals (received) 108b. The third base station 104c may use the synchronization signals (received) 108b to derive synchronization.

The first base station 104a may communicate with one or more wireless communication devices 114. A wireless communication device 114 may also be referred to as, and may include some or all of the functionality of, a terminal, an access terminal, a user equipment (UE), a subscriber unit, a station, etc. A wireless communication device 114 may be a cellular phone, a personal digital assistant (PDA), a wireless device, a wireless modem, a handheld device, a laptop computer, etc. A wireless communication device 114 may communicate with zero, one, or multiple base stations 104 on the downlink 116 and/or uplink 118 at any given moment. The downlink 116 (or forward link) refers to the communication link from a base station 104 to a wireless communication device 114, and the uplink 118 (or reverse link) refers to the communication link from a wireless communication device 114 to a base station 104. As part of communicating with a wireless communication device 114, the first base station 104a may transmit a common reference signal (CRS) 120 to the wireless communication device 114. The common reference signal (CRS) 120 may be used by the wireless communication device 114 for cell search, initial acquisition and downlink 116 channel quality measurements.

The first base station 104a may include a current number 106 of intermediate synchronous nodes between the base station and the global positioning system (GPS) server. The number 106 of intermediate synchronous nodes between a base station 104 and the global position system (GPS) server 102 may be referred to as stratum. In FIG. 1, the current number 106 of intermediate synchronous nodes between the first base station 104a and the global positioning system (GPS) server 102 is one (the second base station 104b). Thus, the first base station 104a has a current stratum of Stratum-1.

The first base station 104a may include a coordinated silence module 112. As discussed above, the first base station 104a may acquire synchronization from the second base station 104b and provide synchronization to the third base station 104b. When the first base station 104a is acquiring synchronization from the second base station 104b, the first base station 104a may monitor the synchronization signals (transmit) 110b from the second base station 104b. To monitor the synchronization signals (transmit) 110b from the second base station 104b, the first base station 104a may have to stop transmitting to the wireless communication device 114 in some slots where the first base station 104a may normally transmit. These transmissions may include the common reference signal (CRS) 120 as well as other network information or data transfers.

These periods of silence may impact a wireless communication device 114 that is expecting transmissions from the first base station 104a and/or trying to perform channel measurements. Even if the wireless communication device 114 is not scheduled in some subframes, the wireless communication device 114 may still expect the transmission of the common reference signal (CRS) 120 from the first base station 104a. If the first base station 104a is monitoring the synchronization signals (transmit) 110b of the second base station 104b or transmitting synchronization signals (transmit) 108a to the third base station 104c, the first base station 104a may not transmit the common reference signal (CRS) 120 to the wireless communication device 114. In order to not disrupt the wireless communication device 114 and the whole wireless communication system 100, the impact of these coordinated silence periods needs to be minimized.

The coordinated silence module 112 may determine the length and starting times of each coordinated silence period. The length and starting time for each coordinated silence period may be controlled by the wireless communication network 100. The coordinated silence module 112 may minimize the impact of coordinated silence periods on a wireless communication device 114.

Different methods may be used to support self synchronization while minimizing the impact on the wireless communication device 114. For example, the coordinated silence module 112 may inform the wireless communication device 114 of upcoming coordinated silence periods. As another example, the coordinated silence module 112 may use a channel such as the Primary Synchronization Signal (PSS) 109*a* or Secondary Synchronization Signal (SSS) 109*b* to achieve synchronization with the second base station 104*b* while continuing to transmit the common reference signal (CRS) 120. The PSS/SSS 109 occupy only the last two OFDM symbols of a slot and do not overlap with the common reference signal (CRS) 120 in either the time domain or the frequency domain. Thus, the common reference signal (CRS) 120 can still be transmitted while the first base station 104*a* is monitoring the PSS/SSS 109 of the second base station 104*b*. Tracking the PSS/SSS 109 may come at the cost of some backwards compatibility since the first base station 104*a* would need to shut down its PSS/SSS transmission to monitor the PSS/SSS 109 of the donor second base station 104*b*. In yet another example, the coordinated silence module 112 may gradually lower and then increase power to the wireless communication device 114 to mimic a fade. The wireless communication device 114 may interpret the absence of a common reference signal (CRS) 120 to be caused by the propagation environment and wait for conditions to improve. This would depend on the implantation and duration of the fade.

Figure 2:
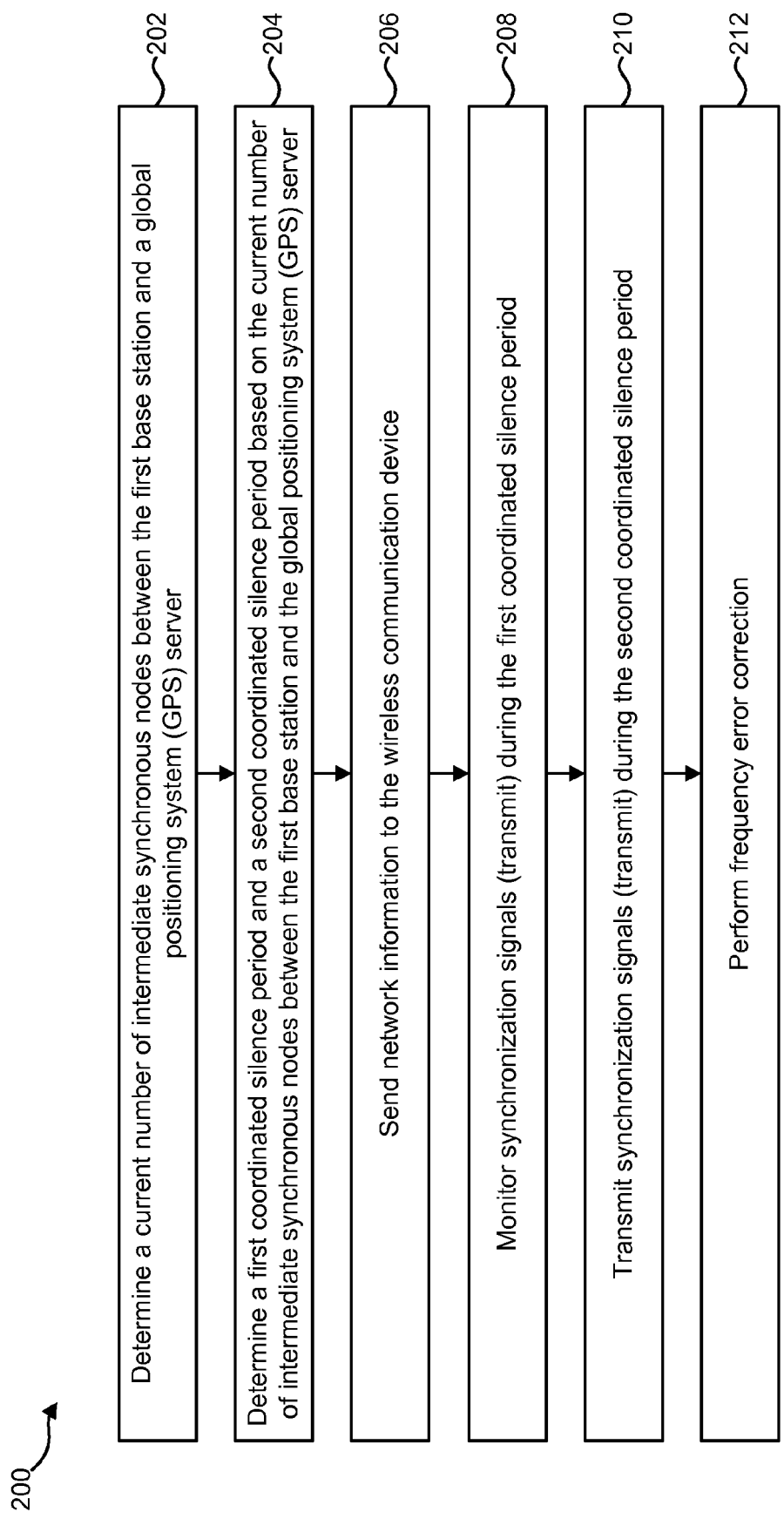
FIG. 2 is a flow diagram of a method for self synchronization of a base station.

FIG. 2 is a flow diagram of a method 200 for self synchronization of a base station 104. The method 200 may be performed by the first base station 104*a*. As discussed above, the first base station 104*a* may be a home evolved NodeB (HeNB). The first base station 104*a* may determine 202 a current number 106 of intermediate synchronous nodes between the first base station 104*a* and a global positioning system (GPS) server 102. The number 106 of intermediate synchronous nodes between a base station 104 and the global positioning system (GPS) server 102 may be referred to as the stratum. The first base station 104*a* may then determine 204 a first coordinated silence period and a second coordinated silence period based on the current number 106 of intermediate synchronous nodes between the first base station 104*a* and the global positioning system (GPS) server 102. Additional coordinated silence periods may also be determined.

The first base station 104*a* may send 206 network information to a wireless communication device 114. The network information may be based on the determined first coordinated silence period and the determined second coordinated silence period. The network information may be information designed to minimize the impact of the coordinated silence periods on the wireless communication device 114.

The network information may include a multimedia broadcast single frequency network (MBSFN) subframe declaration. In MBSFN, a transmission happens from a time-synchronized set of evolved NodeBs using the same resource block. The use of MBSFN may improve the signal to interference plus noise ratio (SINR) by enabling over the air combining. If a subframe is declared to be MBSFN, a wireless communication device 114 will ignore the later part of this subframe. MBSFN subframe declarations are discussed in additional detail below in relation to FIG. 3.

The network information may include a discontinuous receive (DRX) mode message. A DRX mode message may cause a wireless communication device 114 to sleep for a longer period of time. This longer period of time may coincide with the first coordinated silence period and/or the second coordinated silence period. The wireless communication device 114 may then not be affected by the lack of transmissions from the first base station 104*a*. DRX mode messages are discussed in further detail below in relation to FIG. 4.

The network information may include scheduling information. The scheduling information may indicate to the wireless communication device 114 when transmissions are scheduled from the first base station 104*a* to the wireless communication device 114. By not scheduling any transmissions to the wireless communication device 114 in and around the subframes where no common reference signal (CRS) 120 is transmitted, the impact of using coordinated silence periods may be minimized. Scheduling information is discussed in additional detail below in relation to FIG. 5.

The network information may include a subframe index. The subframe index may inform the wireless communication device 114 of subframes that the first base station 104*a* will not transmit in. If a wireless communication device 114 is aware of the subframes in which the first base station 104*a* is performing self synchronization, the wireless communication device 114 may avoid using those subframes for common reference signal (CRS) 120 estimation. Subframe indexes are discussed in further detail below in relation to FIG. 6.

After the first base station 104*a* has sent the network information to the wireless communication device 114, the first base station 104*a* may monitor 208 synchronization signals (transmit) 110*b* during the first coordinated silence period. The synchronization signals (transmit) 110*b* may be transmitted by a synchronizing base station 104 such as the second base station 104*b*. The first base station 104*a* may cease transmissions while monitoring 208 the synchronization signals (transmit) 110*b*. In one configuration, the first base station 104*a* may continue transmitting the common reference signal (CRS) 120 while monitoring the synchronization signals (transmit) 110*b*.

The first base station 104*a* may transmit 210 synchronization signals (transmit) 108*a* during the second coordinated silence period. The synchronization signals (transmit) 108*a* may be broadcast so that all nearby base stations 104 can receive them. The first base station 104*a* may not send any transmissions to the wireless communication device 114 during the second coordinated silence period. In one configuration, the first base station 104*a* may continue transmitting the common reference signal (CRS) 120 while transmitting the synchronization signals (transmit) 108*a*. The first base station 104*a* may perform 212 frequency error correction. In one configuration, the first base station 104*a* may perform 212 frequency error correction while time-tracking a synchronization source (i.e., receiving synchronization signals (transmit) 110*b* from the second base station 104*b*). The first base station 104*a* may also perform timing error correction.

Figure 3:
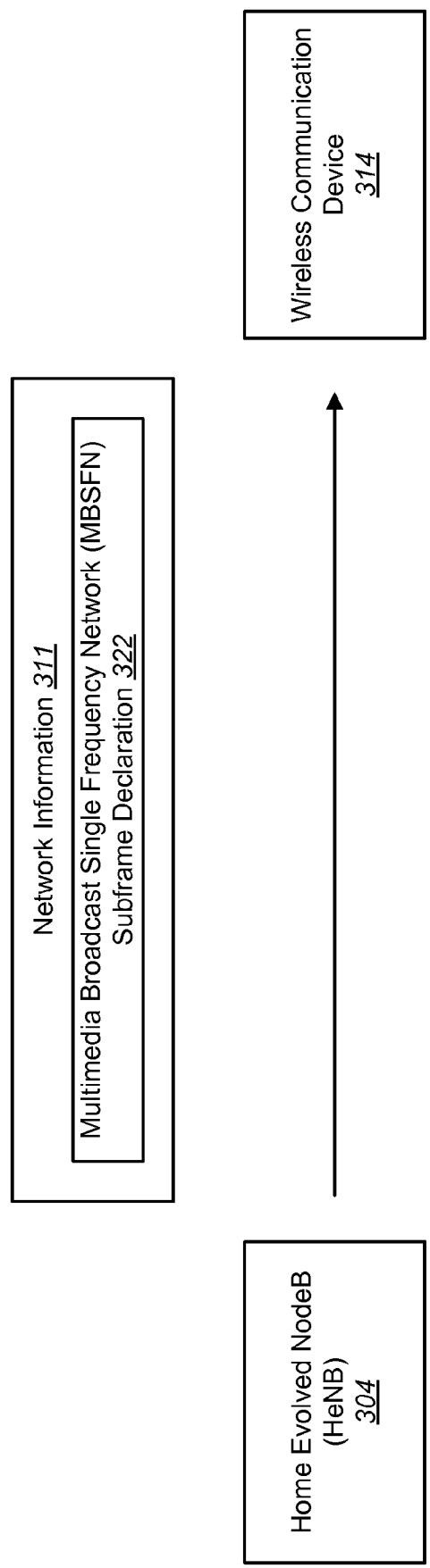
FIG. 3 illustrates the transmission of network information that includes a multimedia broadcast single frequency network (MBSFN) declaration from a home evolved NodeB (HeNB) to a wireless communication device.

FIG. 3 illustrates the transmission of network information 311 that includes a multimedia broadcast single frequency network (MBSFN) declaration 322 from a home evolved NodeB (HeNB) 304 to a wireless communication device 314. The home evolved NodeB (HeNB) 304 of FIG. 3 may be one configuration of the first base station 104*a* of FIG. 1. The wireless communication device 314 of FIG. 3 may be one configuration of the wireless communication device 114 of FIG. 1.

The network information 311 may include a multimedia broadcast single frequency network (MBSFN) subframe declaration 322. The multimedia broadcast single frequency network (MBSFN) subframe declaration 322 may include a bitmap indicating the multimedia broadcast single frequency network (MBSFN) subframe in one of the system information messages (e.g., a system information block (SIB)). As discussed above, parts of subframes declared as multimedia broadcast single frequency network (MBSFN) subframes may be ignored by the wireless communication device 314. The home evolved NodeB (HeNB) 304 can use the common reference signal (CRS) 120 transmitted by the synchronizing base station 104 (i.e., the second base station 104b) for tracking. The synchronizing base station 104 does not need to declare a multimedia broadcast single frequency network (MBSFN) subframe.

Figure 4:
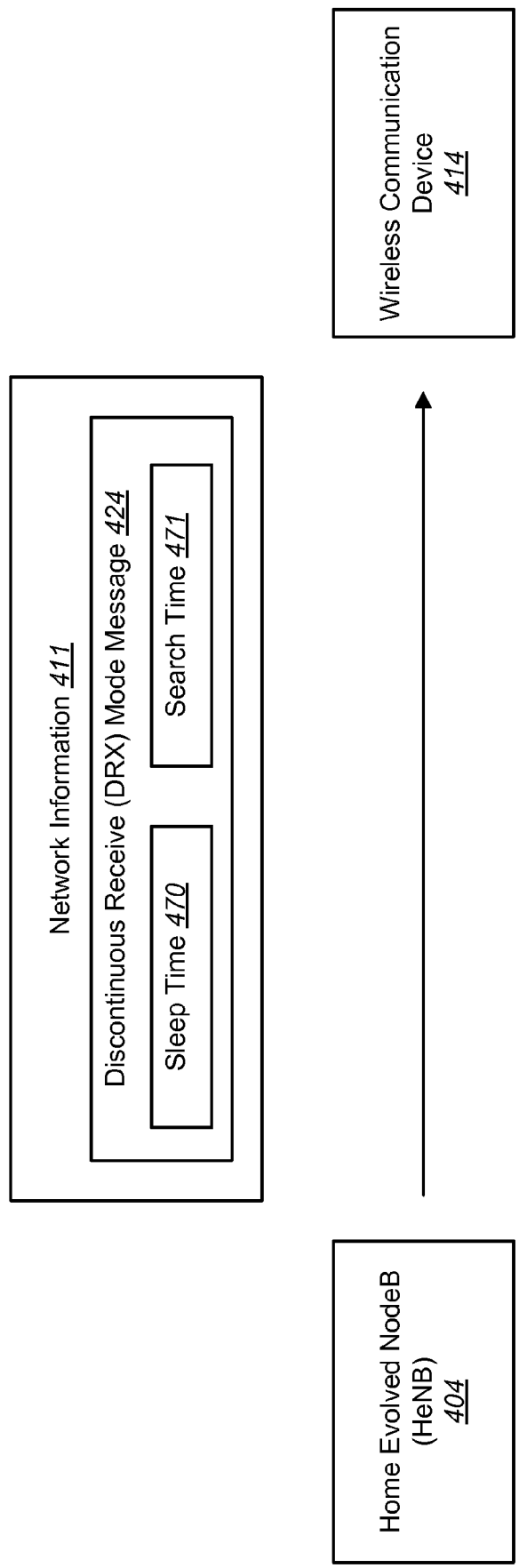
FIG. 4 illustrates the transmission of network information that includes a discontinuous receive (DRX) mode message from a home evolved NodeB (HeNB) to a wireless communication device.

FIG. 4 illustrates the transmission of network information 411 that includes a discontinuous receive (DRX) mode message 424 from a home evolved NodeB (HeNB) 404 to a wireless communication device 414. The home evolved NodeB (HeNB) 404 of FIG. 4 may be one configuration of the first base station 104a of FIG. 1. The wireless communication device 414 of FIG. 4 may be one configuration of the wireless communication device 114 of FIG. 1. The discontinuous receive (DRX) mode message 424 may instruct the wireless communication device 414 to enter a discontinuous receive (DRX) mode, where the wireless communication device 414 sleeps for an extended period of time. If the wireless communication device 414 is asleep when the home evolved NodeB (HeNB) 404 performs self synchronization (i.e., during the first coordinated silence period and the second coordinated silence period), the self synchronization may not affect the performance of the wireless communication device 414. A wireless communication device 414 may be configured for discontinuous receive (DRX) mode by upper layers (such as the Radio Resource Control (RRC)). The discontinuous receive (DRX) mode message 424 may include the amount of time that the wireless communication device 414 sleeps (sleep time 470) and the time the wireless communication device 414 searches for the control channel (search time 471).

Figure 5:
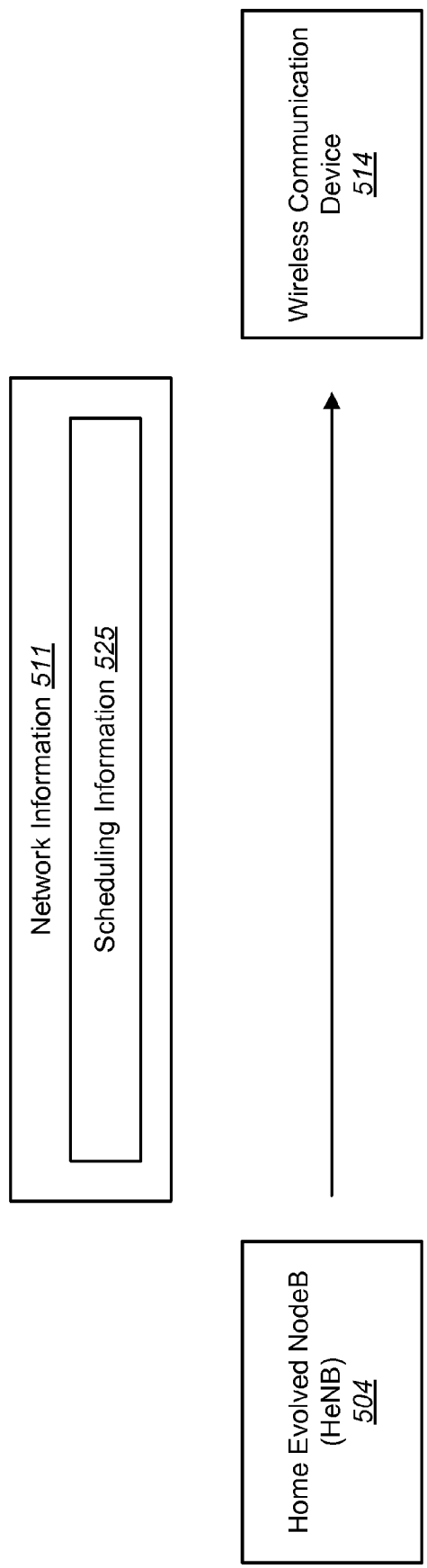
FIG. 5 illustrates the transmission of network information that includes scheduling information from a home evolved NodeB (HeNB) to a wireless communication device.

FIG. 5 illustrates the transmission of network information 511 that includes scheduling information 525 from a home evolved NodeB (HeNB) 504 to a wireless communication device 514. The home evolved NodeB (HeNB) 504 of FIG. 5 may be one configuration of the first base station 104a of FIG. 1. The wireless communication device 514 of FIG. 5 may be one configuration of the wireless communication device 114 of FIG. 1. The scheduling information 525 may implicitly inform the wireless communication device 514 of the coordinated silence periods by not scheduling any transmissions to the wireless communication device 514 during the coordinated silence periods.

Figure 6:
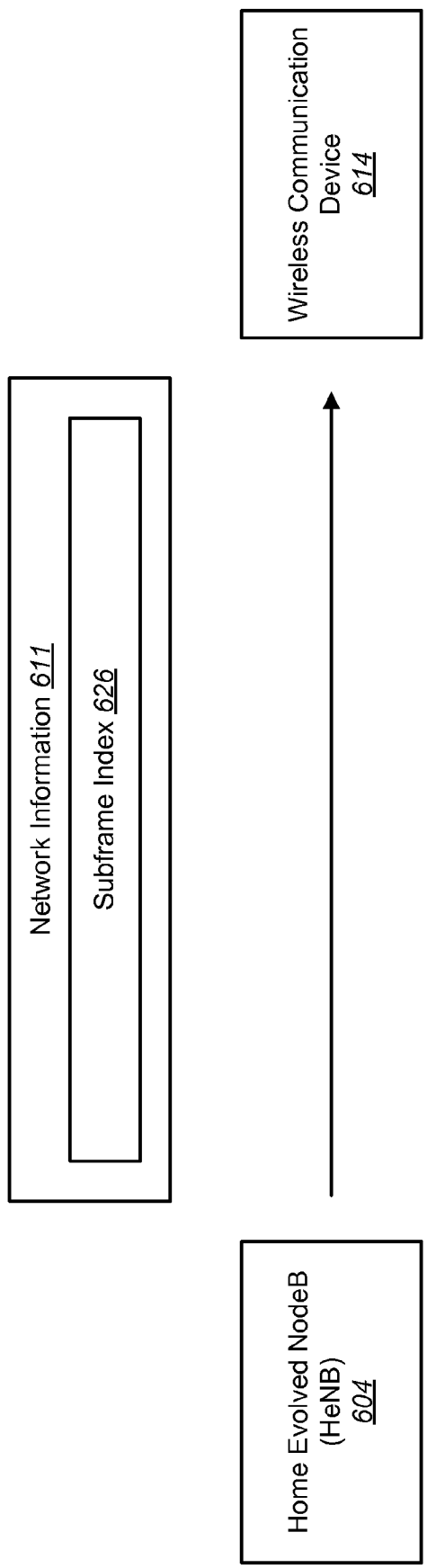
FIG. 6 illustrates the transmission of network information that includes a subframe index from a home evolved NodeB (HeNB) to a wireless communication device.

FIG. 6 illustrates the transmission of network information 611 that includes a subframe index 626 from a home evolved NodeB (HeNB) 604 to a wireless communication device 614. The home evolved NodeB (HeNB) 604 of FIG. 6 may be one configuration of the first base station 104a of FIG. 1. The wireless communication device 614 of FIG. 6 may be one configuration of the wireless communication device 114 of FIG. 1. As discussed above, the subframe index 626 may explicitly inform the wireless communication device 614 of subframes that the home evolved NodeB (HeNB) 604 will not transmit in. The effect of self synchronization by the home evolved NodeB (HeNB) 604 may be minimized if the wireless communication device 614 is aware of the subframes when no transmissions from the home evolved NodeB (HeNB) 604 will be received. The subframe index 626 may also indicate that the subframe is not used for downlink 116 transmissions. The sending of a subframe index 626 to the wireless communication device 614 may not be supported if the wireless communication device 614 is a legacy device but could be supported in future releases. The subframes may be indicated explicitly or implicitly (e.g., as a function of the subframe index 626).

Figure 7:
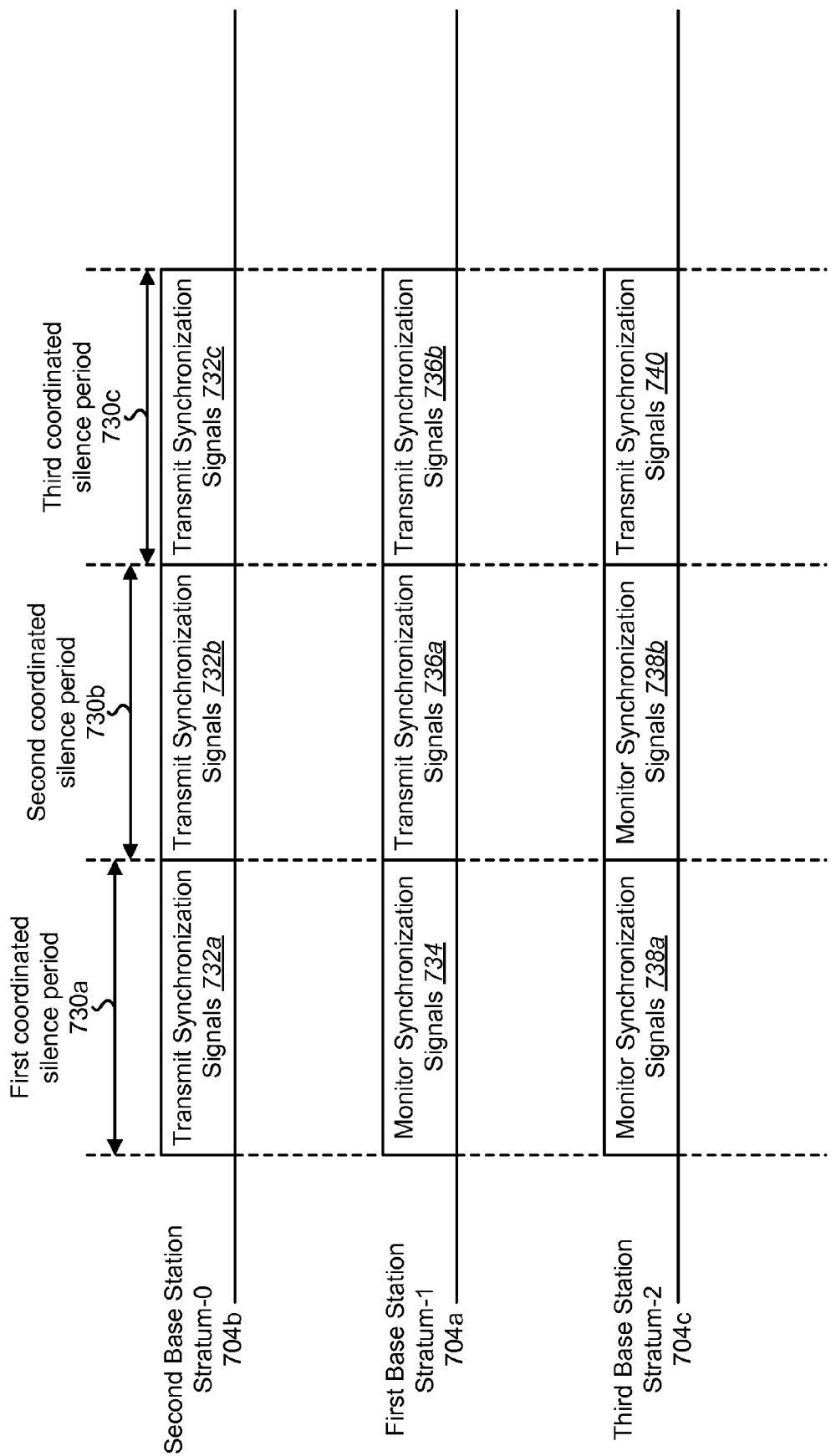
FIG. 7 is a timing diagram illustrating self synchronization with multiple coordinated silence periods.

FIG. 7 is a timing diagram illustrating self synchronization with multiple coordinated silence periods 730. Each coordinated silence period 730 may correspond to the self synchronization of one or more base stations 704. For example, a first coordinate silence period 730a may correspond to the self synchronization of a first base station 704a and a second base station 704b. The first base station 704a may have a stratum of Stratum-1. The second base station 704b may have a stratum of Stratum-0. The first base station 704a may derive synchronization from the second base station 704b. The second base station 704b may derive synchronization from a global positioning system (GPS) source 102.

During the first coordinated silence period 730a, the first base station 704a may monitor 734 synchronization signals and the second base station 704b may transmit 732a synchronization signals. The first base station 704a may monitor 734 synchronization signals from multiple base stations 104 including the second base station 704b. The synchronization signals may be synchronization signals (transmit) 110b such as the Primary Synchronization Signal (PSS) 109a and the Secondary Synchronization Signal (SSS) 109b. The second base station 704b may transmit 732a synchronization signals to other base stations 104 in addition to the first base station 704a. A third base station 704c may derive synchronization from the first base station 704a. The third base station 704c may have a stratum of Stratum-2. During the first coordinated silence period 730a, the third base station 704c may remain silent while attempting to monitor 738a for synchronization signals. If the third base station 704c detects a change in the network, the third base station 704c may be able to modify the stratum accordingly.

A second coordinated silence period 730b may correspond to the self synchronization of the first base station 704a, the second base station 704b and the third base station 704c. During the second coordinated silence period 730b, the first base station 704a may transmit 736a synchronization signals such synchronization signals (transmit) 108a. The first base station 704a may transmit 736a synchronization signals to multiple base stations 104, including the third base station 704c. During the second coordinated silence period 730b, the third base station 704c may monitor 738b synchronization signals. The second base station 704b may also transmit 732b synchronization signals during the second coordinated silence period 730b.

A third coordinated silence period 730c may correspond to the self synchronization of the first base station 704a, the second base station 704b and the third base station 704c. During the third coordinated silence period 730c, the third base station 704c may transmit 740 synchronization signals. The first base station 704a may also transmit 736b synchronization signals during the third coordinated silence period 730c. In addition, the second base station 704b may transmit 732c synchronization signals during the third coordinated silence period 730c. Other base stations 104 (not shown) may receive the synchronization signals transmitted by the third base station 704c.

Figure 8:
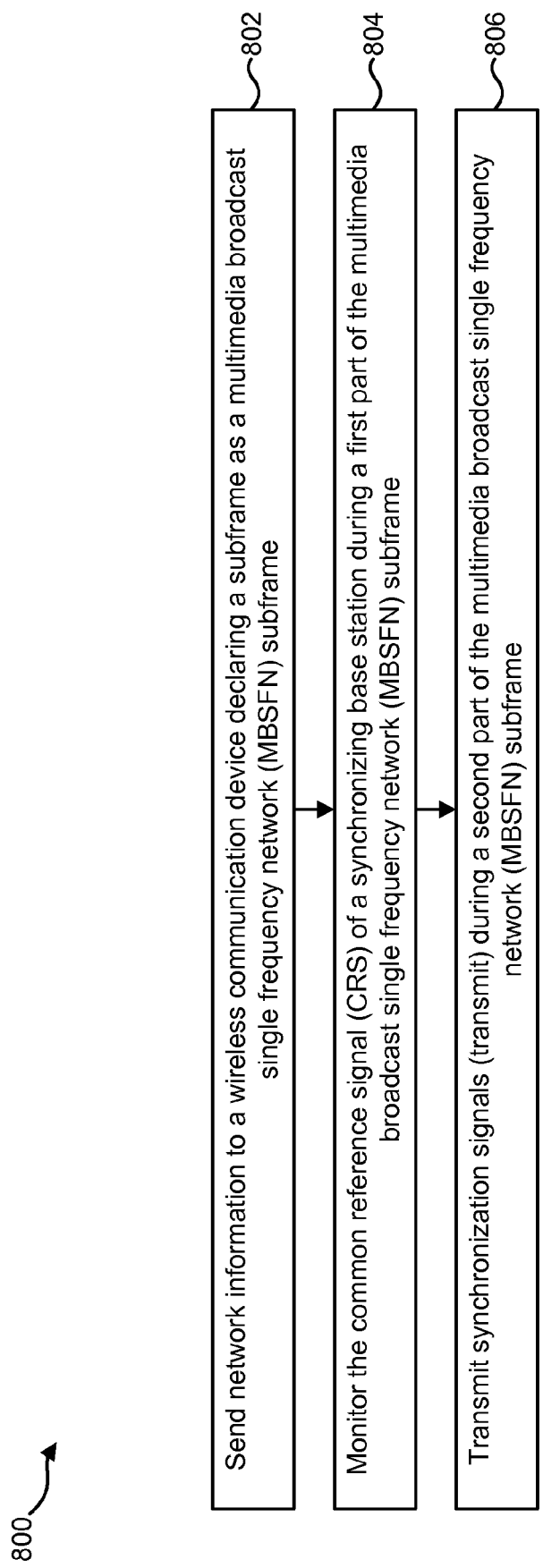
FIG. 8 is a flow diagram of a method for self synchronization using multimedia broadcast single frequency network (MBSFN) subframes.

FIG. 8 is a flow diagram of a method 800 for self synchronization using multimedia broadcast single frequency network (MBSFN) subframes. The method 800 of FIG. 8 may be performed by a first base station 104a. The first base station 104a may be a home evolved NodeB (HeNB) 304. The first base station 104a may send 802 network information 311 to a wireless communication device 114 declaring a subframe as a multimedia broadcast single frequency network (MBSFN) subframe.

The first base station 104a may then monitor 804 the common reference signal (CRS) of a synchronizing base station 104b during a first part of the multimedia broadcast single frequency network (MBSFN) subframe. The first base station 104a may transmit 806 synchronization signals (transmit) 108a during a second part of the multimedia broadcast single frequency network (MBSFN) subframe. A subframe may have two slots (i.e., each slot may be a part of the subframe). The first part (or first slot) of the multimedia broadcast single frequency network (MBSFN) subframe may be used for monitoring while the second part (or second slot) may be used for transmitting. In one configuration, an entire subframe may be used for either monitoring or transmitting. As discussed above, a wireless communication device 114 may ignore subframes that have been declared as multimedia broadcast single frequency network (MBSFN) subframes.

Figure 9:
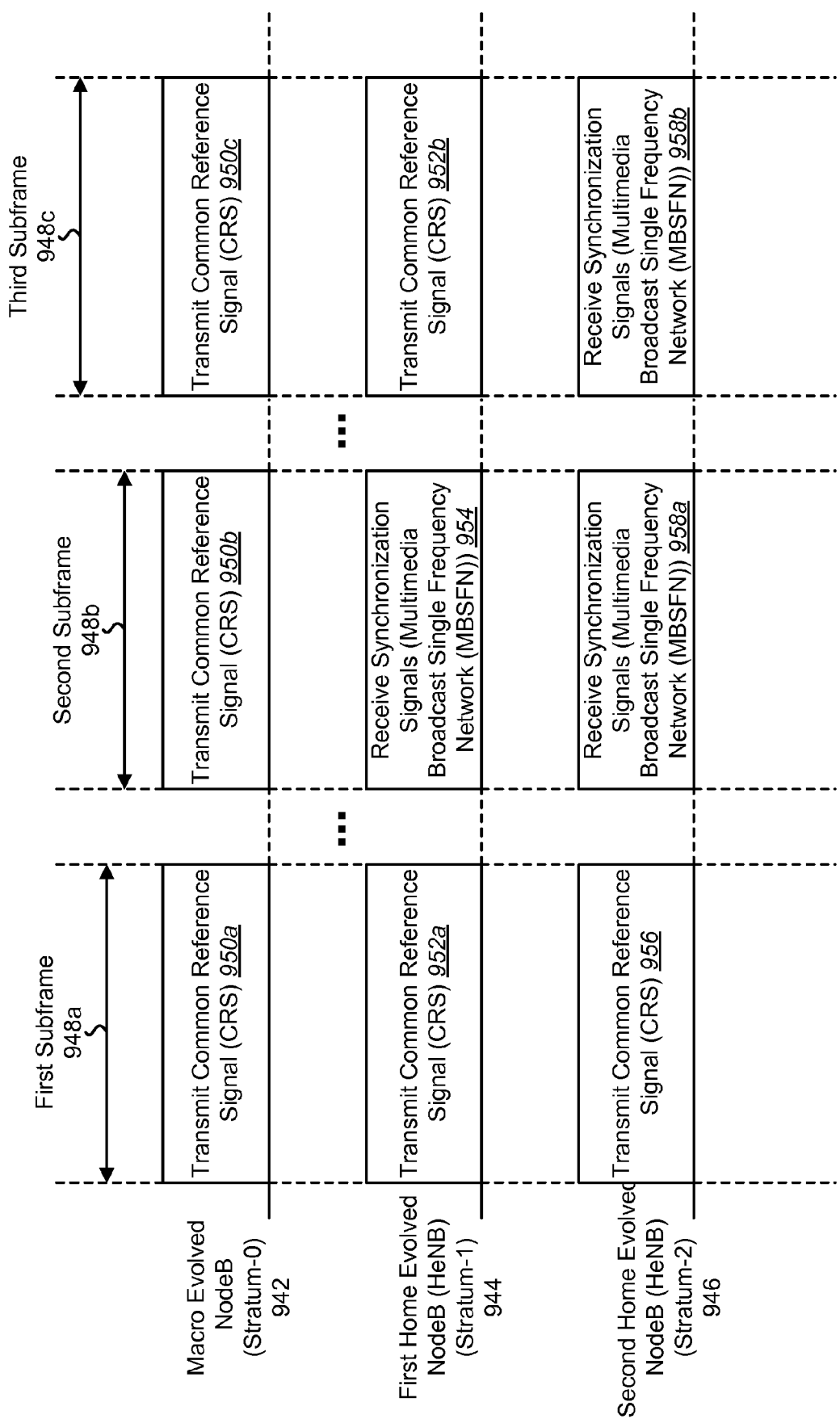
FIG. 9 is a timing diagram illustrating tracking using multimedia broadcast single frequency network (MBSFN) subframes.

FIG. 9 is a timing diagram illustrating tracking using multimedia broadcast single frequency network (MBSFN) subframes. A home evolved NodeB (HeNB) 314 may stop transmitting for a subframe 948 to track synchronization. To minimize the impact of tracking synchronization, the home evolved NodeB (HeNB) 314 may declare this subframe 948 to be a multimedia broadcast single frequency network (MBSFN) subframe. This method allows for multiple hops in the synchronization path. Also, all the nodes in a wireless communication system 100 can track in a coordinated fashion (by all declaring multimedia broadcast single frequency network (MBSFN) subframes at the same time), thus minimizing interference.

Timing structures for a macro evolved NodeB 942, a first home evolved NodeB (HeNB) 944 and a second home evolved NodeB (HeNB) 946 are illustrated. The macro evolved NodeB 942 of FIG. 9 may be one configuration of the second base station 104b of FIG. 1 and may have a stratum of Stratum-0. The first home evolved NodeB (HeNB) 944 of FIG. 9 may be one configuration of the first base station 104a of FIG. 1 and may have a stratum of Stratum-1. The second home evolved NodeB (HeNB) 946 of FIG. 9 may be one configuration of the third base station 104c of FIG. 1 and may have a stratum of Stratum-2.

During a first subframe 948a, the macro evolved NodeB 942 may transmit 950a a common reference signal (CRS). The first home evolved NodeB (HeNB) 944 may also transmit 952a a common reference signal (CRS) 120. Also, the second home evolved NodeB (HeNB) 946 may transmit 956 a common reference signal (CRS).

The second subframe 948b of FIG. 9 may be one configuration of the first coordinated silence period 730a of FIG. 7. The macro evolved NodeB 942 may transmit 950b the common reference signal (CRS) during the second subframe 948b. The first home evolved NodeB (HeNB) 944 may receive 954 synchronization signals during the second subframe 948b. Thus, the first home evolved NodeB (HeNB) 944 may need to declare the second subframe 948b as a multimedia broadcast single frequency network (MBSFN) subframe to those wireless communication devices 114 communicating with the first home evolved NodeB (HeNB) 944. The second home evolved NodeB (HeNB) 946 may also receive 958a synchronization signals during the second subframe 948b. Thus, the second home evolved NodeB (HeNB) 946 may also need to declare the second subframe 948b as a multimedia broadcast single frequency network (MBSFN) subframe. In one configuration, the second home evolved NodeB (HeNB) 946 may find and receive 958a synchronization signals during the second subframe 948b from another base station 104 with a lower stratum.

The third subframe 948c of FIG. 9 may be one configuration of the second coordinated silence period 730b of FIG. 7. The macro evolved NodeB 942 may transmit 950c the common reference signal (CRS) during the third subframe 948c. The first home evolved NodeB (HeNB) 944 may also transmit 952b the common reference signal (CRS) 120 during the third subframe 948c. The second home evolved NodeB (HeNB) 946 may receive 958b synchronization signals during the third subframe 948c from the first home evolved NodeB (HeNB) 944. Therefore, the second home evolved NodeB (HeNB) 946 may need to declare the third subframe 948c as a multimedia broadcast single frequency network (MBSFN) subframe to those wireless communication devices 114 communicating with the second home evolved NodeB (HeNB) 946.

Using multimedia broadcast single frame network (MBSFN) subframes ensures that the entire network uses the same synchronization source (e.g., a global navigation satellite system (GNSS) such as the global positioning system (GPS) server 102) and loops are not created. This is because each home evolved NodeB (HeNB) 944, 946 declares its stratum as one greater than that of its donor base station 104. The stratum number of a home evolved NodeB (HeNB) 944, 946 is self-configured. In addition, the home evolved NodeB (HeNB) 944, 946 tries to track the node with the lowest available stratum. This in turn allows the home evolved NodeB (HeNB) 944, 946 to be as close to the timing of the GNSS as possible. The stratum number is a dynamic quality that could vary with changing conditions (such as home evolved NodeBs (HeNBs) 944, 946 being shut off).

Figure 10:
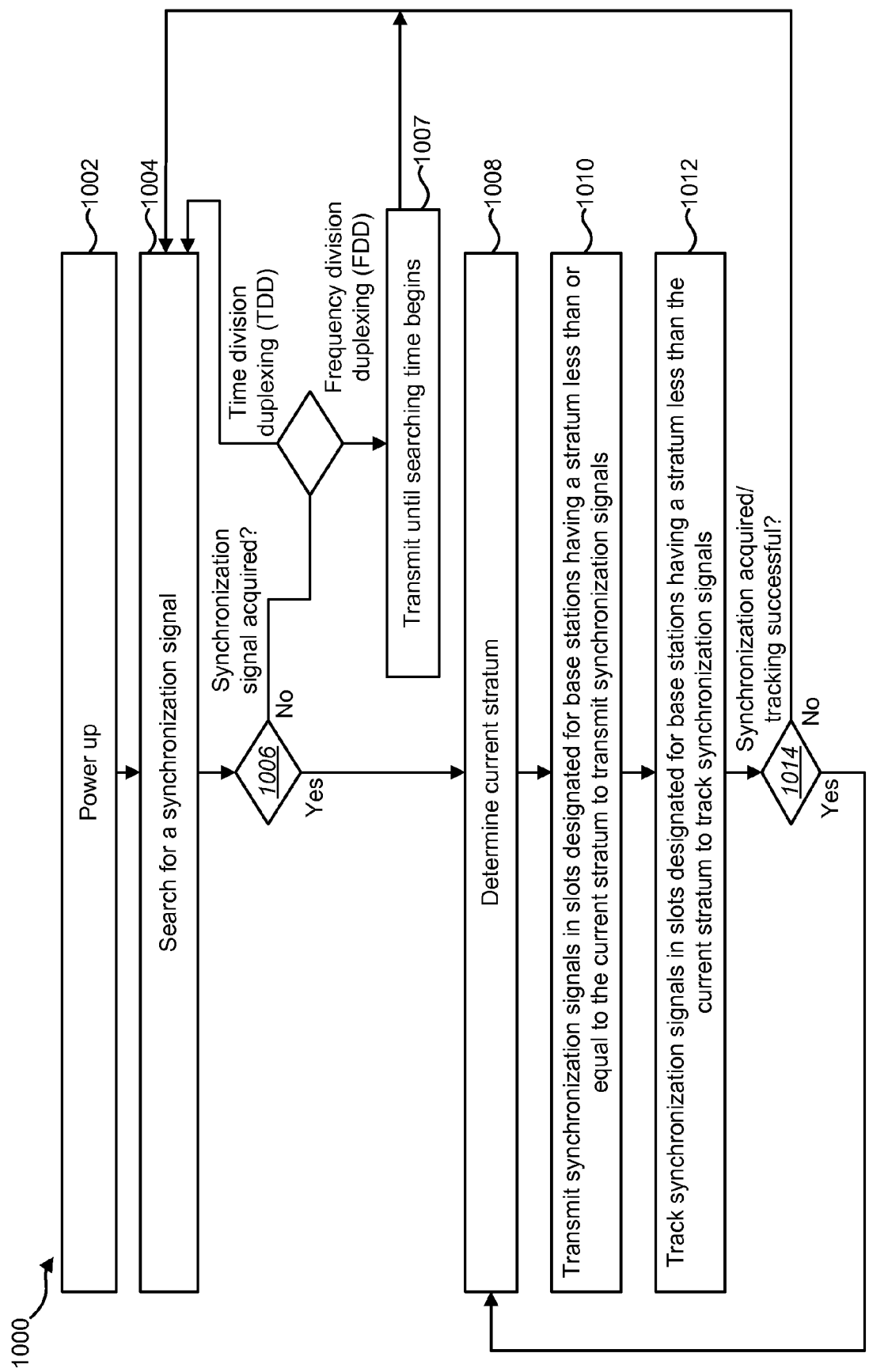
FIG. 10 is a flow diagram of another method for self synchronization using multimedia broadcast single frequency network (MBSFN) subframes.

FIG. 10 is a flow diagram of another method 1000 for self synchronization. The method 1000 may be performed by a base station 104a. The base station 104a may be a home evolved NodeB (HeNB) 304. The base station 104a may first power up 1002. The base station 104a may then search 1004 for a synchronization signal (such as a Primary Synchronization Signal (PSS), a Secondary Synchronization Signal (SSS) or a common reference signal (CRS)). While the base station 104a searches 1004 for a synchronization signal, transmissions from the base station 104 may be turned off. The base station 104a may then determine 1006 whether a synchronization signal has been acquired. If a synchronization signal has not been acquired and the base station 104a is operating in a time division duplexing (TDD) mode, the base station 104a may continue searching 1004 for a synchronization signal. If a synchronization signal has not been acquired and the base station 104a is operating in a frequency division duplexing (FDD) mode, the base station 104a may transmit 1007 until a searching time begins. Once the searching time begins, the base station 104a may return to searching 1004 for synchronization signals.

If a synchronization signal has been acquired, the base station 104a may determine 1008 a current stratum. The current stratum may be one greater than the stratum of a synchronizing base station 104b broadcasting the synchronization signal. The stratum of a synchronizing base station 104b may be included in the broadcast of the synchronization signal.

The base station 104a may transmit 1010 synchronization signals (such as a common reference signal (CRS) 120) in slots designated for base stations having a stratum less than or equal to the current stratum to transmit synchronization signals. The base station 104a may also track 1012 synchronization signals (such as a common reference signal (CRS) 120) in slots designated for base stations having a stratum less than or equal to the current stratum to monitor synchronization signals. In other words, the base station 104a may transmit synchronization signals (transmit) 108a in a first coordinated silence period. During the first coordinated silence period, all base stations 104 with a stratum less than or equal to the current stratum will also transmit synchronization signals. The base station 104a may remain silent in a second coordinated silence period and track synchronization signals (received) 110a. During the second coordinated silence period, one or more base stations 104 with a stratum greater than the current stratum may also be tracking synchronization signals.

There may be a period of silence for each stratum. For example, during a first period of silence, all base stations 104 with a stratum of Stratum-0 may transmit. During the first period of silence, all other base stations 104 (i.e., base stations with a stratum of Stratum-1, Stratum-2 . . . ) remain silent while monitoring synchronization signals. During a second period of silence, all base stations 104 with a stratum of Stratum-1 and Stratum-0 may transmit. During the second period of silence, all other base stations 104 (i.e., base stations with a stratum of Stratum-2, Stratum-3 . . . ) remain silent while monitoring synchronization signals.

The base station 104a may then determine 1014 whether synchronization was acquired/tracking was successful. If synchronization is acquired/tracking is successful, the base station 104a may derive 1008 a new current stratum. If synchronization is not acquired/tracking is not successful, the base station 104a may return to searching 1004 for a synchronization signal.

The overhead incurred by this scheme may depend on the number of hops between a base station 104a and the global positioning system (GPS) source 102. The overhead may be computed as the number of hops multiplied by one subframe in every 320 subframes. The multimedia broadcast single frequency network (MBSFN) subframe method can be used for frequency division duplexing (FDD) for deriving frequency synchronization and potentially time synchronization.

Figure 11:
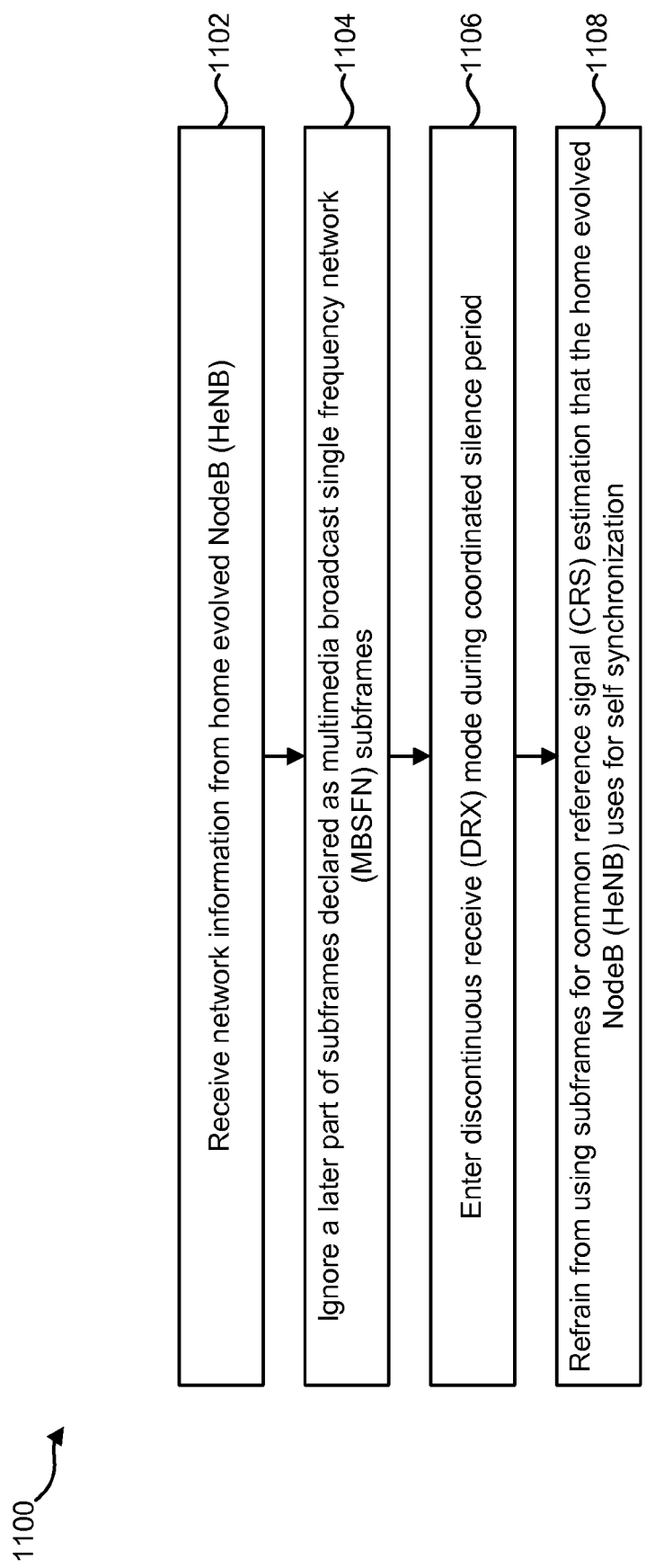
FIG. 11 is a flow diagram of a method for receiving self synchronization network information.

FIG. 11 is a flow diagram of a method 1100 for receiving self synchronization network information 311. The method of FIG. 11 may be performed by a wireless communication device 114. The wireless communication device 114 may receive 1102 network information 311 from a home evolved NodeB (HeNB) 304. The network information 311 may include a multimedia broadcast single frequency network (MBSFN) subframe declaration 322, a discontinuous receive (DRX) mode message 424, scheduling information 525, or a subframe index 626.

The wireless communication device 114 may ignore 1104 a later part of subframes 948 declared as multimedia broadcast single frequency network (MBSFN) subframes. The wireless communication device 114 may also enter 1106 a discontinuous receive (DRX) mode during a coordinated silence period. The wireless communication device 114 may further refrain 1108 from using subframes 948 for common reference signal (CRS) estimation that the home evolved NodeB (HeNB) 304 uses for self synchronization.

Figure 12:
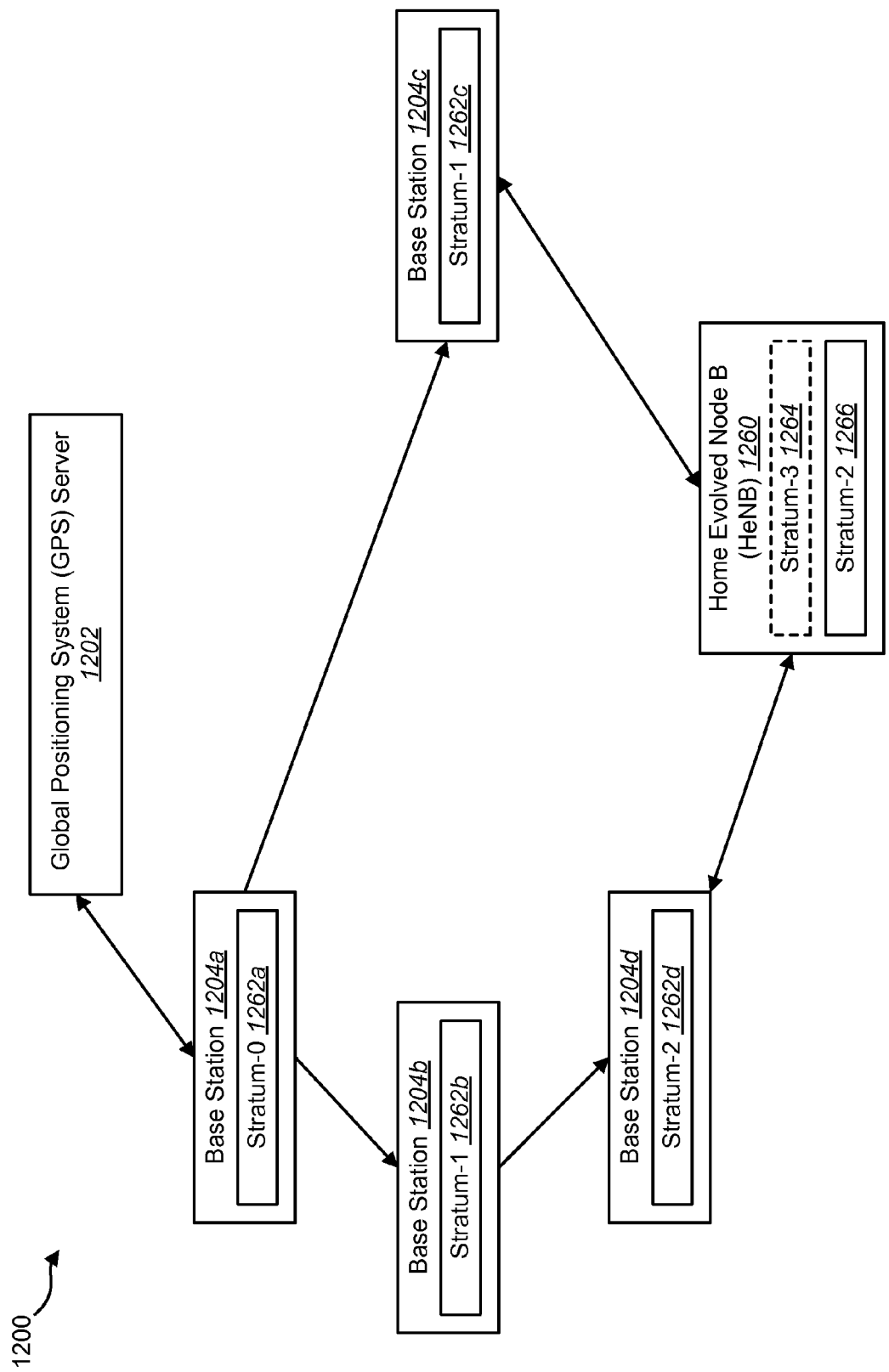
FIG. 12 shows a wireless communication system with multiple wireless devices and their respective stratum.

FIG. 12 shows a wireless communication system 1200 with multiple wireless devices and their respective stratum 1262, 1264, 1266. As discussed above, stratum refers to the number of intermediate synchronous nodes between a base station 1204 and a global positioning system (GPS) server 1202. A base station 1204a that is one hop away from the global positioning system (GPS) server 1202 may have a stratum of Stratum-0 1262a. Base stations 1204b-c that are two hops away from the global positioning system (GPS) server 1202 may have a stratum of Stratum-1 1262b-c.

A base station 1204d that is three hops away from the global positioning system (GPS) server 1202 may have a stratum of Stratum-2 1262d.

Each base station 1204 may derive stratum based on the stratum of the immediately preceding base station 1204 in the line to the global positioning system (GPS) server 1202. For example, a base station 1204d with a stratum of Stratum-2 1262d may derive the stratum from the base station 1204b with a Stratum-1 1262b. A home evolved NodeB (HeNB) 1260 that is unsynchronized may derive the stratum from each base station 1204 that the home evolved NodeB (HeNB) 1260 receives synchronization information from. For example, the home evolved NodeB (HeNB) 1260 may derive a Stratum-3 1264 based on the Stratum-2 1262d of the base station 1204d. The home evolved NodeB (HeNB) 1260 may also derive a Stratum-2 1266 based on the Stratum-1 1262c of the base station 1204c. The derived stratum 1264, 1266 may be one greater than the stratum 1262 of the preceding base station 1204. The home evolved NodeB (HeNB) 1260 may select the base station 1204 with the corresponding lowest stratum 1262 as the synchronizing base station. Thus, the home evolved NodeB (HeNB) 1260 may select base station 1204c as the synchronizing base station and Stratum-2 1266 as the current stratum.

Figure 13:
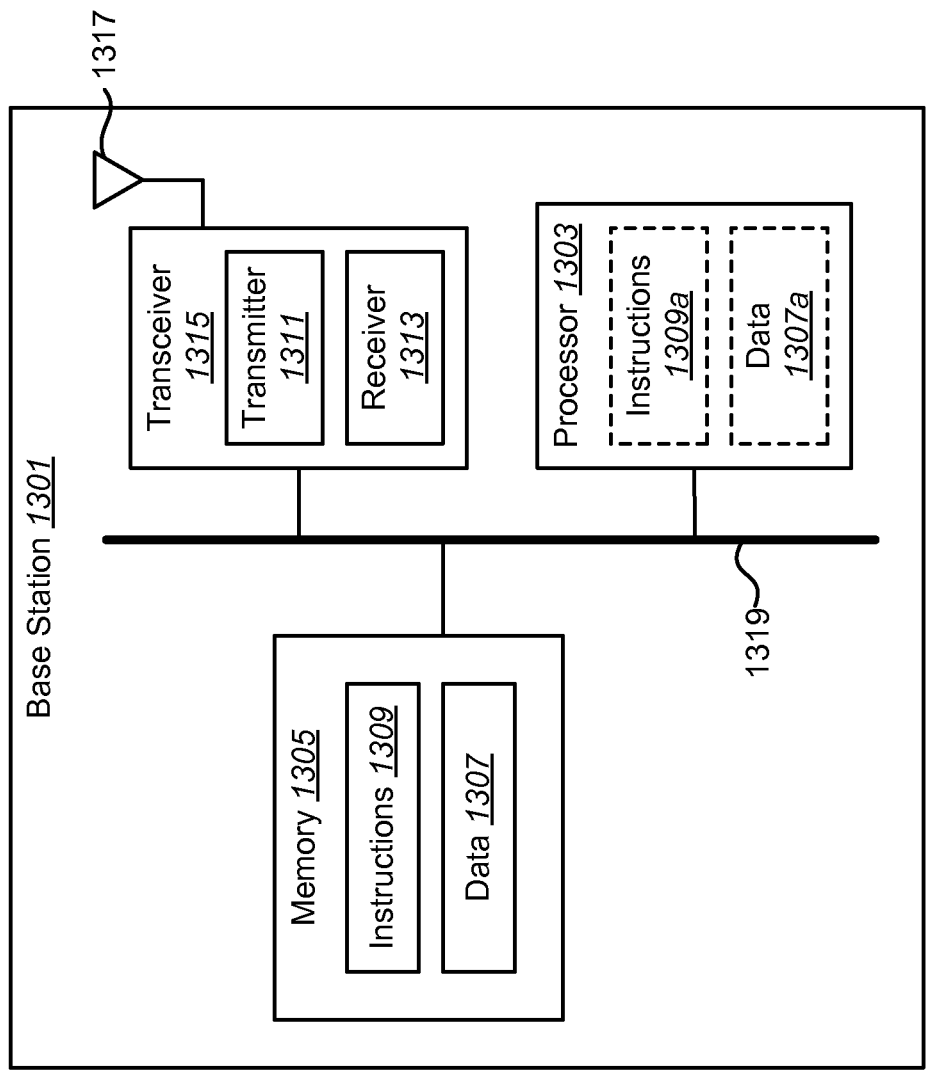
FIG. 13 illustrates certain components that may be included within a base station.

FIG. 13 illustrates certain components that may be included within a base station 1301. A base station may also be referred to as, and may include some or all of the functionality of, an access point, a broadcast transmitter, a NodeB, an evolved NodeB, etc. The base station 1301 includes a processor 1303. The processor 1303 may be a general purpose single- or multi-chip microprocessor (e.g., an ARM), a special purpose microprocessor (e.g., a digital signal processor (DSP)), a microcontroller, a programmable gate array, etc. The processor 1303 may be referred to as a central processing unit (CPU). Although just a single processor 1303 is shown in the base station 1301 of FIG. 13, in an alternative configuration, a combination of processors (e.g., an ARM and DSP) could be used.

The base station 1301 also includes memory 1305. The memory 1305 may be any electronic component capable of storing electronic information. The memory 1305 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1307 and instructions 1309 may be stored in the memory 1305. The instructions 1309 may be executable by the processor 1303 to implement the methods disclosed herein. Executing the instructions 1309 may involve the use of the data 1307 that is stored in the memory 1305. When the processor 1303 executes the instructions 1309, various portions of the instructions 1309a may be loaded onto the processor 1303, and various pieces of data 1307a may be loaded onto the processor 1303.

The base station 1301 may also include a transmitter 1311 and a receiver 1313 to allow transmission and reception of signals to and from the base station 1301. The transmitter 1311 and receiver 1313 may be collectively referred to as a transceiver 1315. An antenna 1317 may be electrically coupled to the transceiver 1315. The base station 1301 may also include (not shown) multiple transmitters, multiple receivers, multiple transceivers and/or additional antennas.

The various components of the base station 1301 may be coupled together by one or more buses, which may include a power bus, a control signal bus, a status signal bus, a data bus, etc. For the sake of clarity, the various buses are illustrated in FIG. 13 as a bus system 1319.

Figure 14:
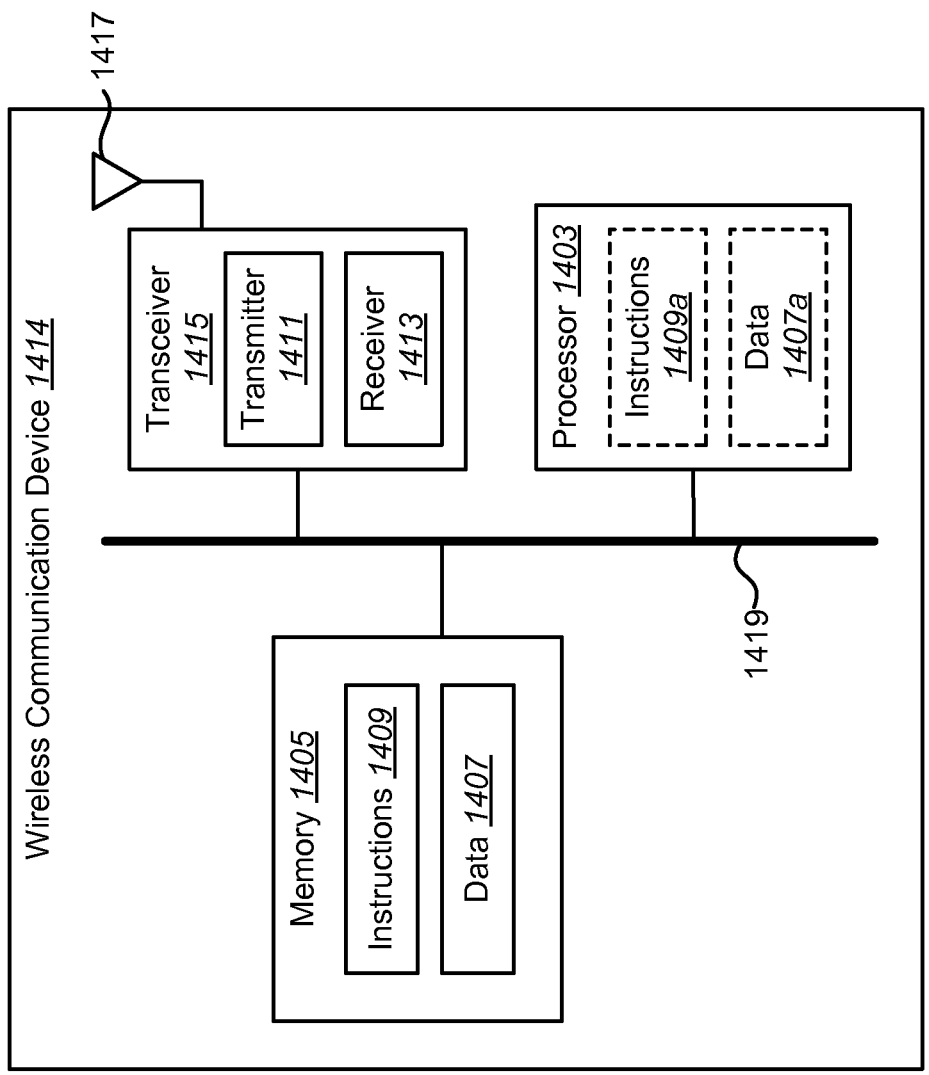
FIG. 14 illustrates certain components that may be included within a wireless communication device.

FIG. 14 illustrates certain components that may be included within a wireless communication device 1414. The wireless communication device 1414 may be an access terminal, a mobile station, a user equipment (UE), etc. The wireless communication device 1414 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the wireless communication device 1414 of FIG. 14, in an alternative configuration, a combination of processors (e.g., an ARM and DSP) could be used.

The wireless communication device 1414 also includes memory 1405. The memory 1405 may be any electronic component capable of storing electronic information. The memory 1405 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1407 and instructions 1409 may be stored in the memory 1405. The instructions 1409 may be executable by the processor 1403 to implement the methods disclosed herein. Executing the instructions 1409 may involve the use of the data 1407 that is stored in the memory 1405. When the processor 1403 executes the instructions 1409, various portions of the instructions 1409a may be loaded onto the processor 1403, and various pieces of data 1407a may be loaded onto the processor 1403.

The wireless communication device 1414 may also include a transmitter 1411 and a receiver 1413 to allow transmission and reception of signals to and from the wireless communication device 1414. The transmitter 1411 and receiver 1413 may be collectively referred to as a transceiver 1415. A first antenna 1417a and a second antenna 1417b may be electrically coupled to the transceiver 1415. The wireless communication device 1414 may also include (not shown) multiple transmitters, multiple receivers, multiple transceivers and/or additional antennas.

The various components of the wireless communication device 1414 may be coupled together by one or more buses, which may include a power bus, a control signal bus, a status signal bus, a data bus, etc. For the sake of clarity, the various buses are illustrated in FIG. 14 as a bus system 1419.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 8, and 10-11, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for self synchronization by a base station, comprising:
   sending, by the base station, network information to a wireless communication device, wherein the network information indicates a first time period, wherein the first time period is a period of silence by the base station, and wherein the base station has a current stratum;
   monitoring, by the base station, synchronization signals during the first time period, wherein monitoring synchronization signals comprises not transmitting; and
   transmitting, by the base station, synchronization signals in a second time period, wherein the second time period comprises slots designated for base stations having a stratum less than or equal to the current stratum to transmit synchronization signals.

2. The method of claim 1, wherein the first time period comprises slots designated for base stations having a stratum less than or equal to the current stratum to monitor synchronization signals.

3. The method of claim 1, wherein the network information comprises a multimedia broadcast single frequency network subframe declaration.

4. The method of claim 3, further comprising receiving a common reference signal from a synchronizing node, wherein the base station uses the common reference signal for tracking.

5. The method of claim 3, wherein the base station has a current stratum, and further comprising tracking a common reference signal in subframes declared as multimedia broadcast single frequency network for a stratum less than or equal to the current stratum.

6. The method of claim 1, further comprising:
   searching for a synchronization signal;
   determining whether the synchronization signal has been acquired; and
   determining the current stratum based on the synchronization signal if the synchronization signal has been acquired.

7. The method of claim 1, wherein the network information comprises a message instructing the one or more wireless communication devices to enter a discontinuous receive mode during the period of silence.

8. The method of claim 7, wherein the network information comprises a sleep time for the wireless communication device.

9. The method of claim 1, wherein the network information comprises identifying one or more subframes when the base station performs self synchronization.

10. The method of claim 1, wherein the network information comprises a subframe index, wherein the subframe index implicitly indicates one or more subframes when the base station performs self synchronization.

11. The method of claim 1, wherein monitoring synchronization signals comprises time-tracking a synchronization source, and further comprising performing frequency error correction while time-tracking the synchronization source.

12. The method of claim 1, wherein sending the network information comprises gradually decreasing power and then gradually increasing the power to mimic a deep fade.

13. The method of claim 1, wherein sending the network information comprises simultaneously transmitting a common reference signal to the wireless communication device while achieving self synchronization using a primary synchronization signal on the last two orthogonal frequency division multiplexing symbols of a slot.

14. The method of claim 1, wherein sending the network information comprises simultaneously transmitting a common reference signal to the wireless communication device while achieving self synchronization using a secondary synchronization signal on the last two orthogonal frequency division multiplexing symbols of a slot.

15. The method of claim 1, wherein the period of silence is coordinated by a network.

16. A method for self synchronization by a base station, comprising:
   sending network information to a wireless communication device, wherein the network information indicates a first time period, wherein the first time period is a period of silence by the base station, wherein the network information comprises a multimedia broadcast single frequency network subframe declaration, and wherein the base station has a current stratum;
   monitoring synchronization signals during the first time period, wherein monitoring synchronization signals comprises not transmitting; and
   transmitting a common reference signal in subframes declared as multimedia broadcast single frequency network for a stratum greater the current stratum, wherein the subframes declared as multimedia broadcast single frequency network comprise a second time period.

17. A method for self synchronization by a base station, comprising:
   sending network information to a wireless communication device, wherein the network information indicates a first time period, wherein the first time period is a period of silence by the base station, wherein the network information comprises a multimedia broadcast single frequency network subframe declaration; and
   monitoring synchronization signals during the first time period, wherein monitoring synchronization signals comprises not transmitting;

wherein the network information comprises scheduling information, and wherein the scheduling information comprises no scheduled transmissions to the wireless communication device in and around subframes where no common reference signal is transmitted.

18. A wireless device configured for self synchronization, comprising:
a processor;
memory in electronic communication with the processor;
instructions stored in the memory, the instructions being executable by the processor to:
send network information to a wireless communication device, wherein the network information indicates a first time period, wherein the first time period is a period of silence by the wireless device, and wherein the wireless device as a current stratum;
monitor synchronization signals during the first time period, wherein monitoring synchronization signals comprises not transmitting; and
transmit synchronization signals in a second time period, wherein the second time period comprises slots designated for base stations having a stratum less than or equal to the current stratum to transmit synchronization signals.

19. The wireless device of claim 18, wherein the first time period comprises slots designated for base stations having a stratum less than or equal to the current stratum to monitor synchronization signals.

20. The wireless device of claim 18, wherein the network information comprises a multimedia broadcast single frequency network subframe declaration.

21. The wireless device of claim 20, wherein the instructions are further executable to receive a common reference signal from a synchronizing node, wherein the wireless device uses the common reference signal for tracking.

22. The wireless device of claim 20, wherein the wireless device has a current stratum, and wherein the instructions are further executable to track a common reference signal in subframes declared as multimedia broadcast single frequency network for a stratum less than or equal to the current stratum.

23. The wireless device of claim 18, wherein the instruction are further executable to:
search for a synchronization signal;
determine whether the synchronization signal has been acquired; and
determine the current stratum based on the synchronization signal if the synchronization signal has been acquired.

24. The wireless device of claim 18, wherein the network information comprises a message instructing the one or more wireless communication devices to enter a discontinuous receive mode during the period of silence.

25. The wireless device of claim 24, wherein the network information comprises a sleep time for the wireless communication device.

26. The wireless device of claim 18, wherein the network information comprises identifying one or more subframes when the wireless device performs self synchronization.

27. The wireless device of claim 18, wherein the network information comprises a subframe index, wherein the subframe index implicitly indicates one or more subframes when the wireless device performs self synchronization.

28. The wireless device of claim 18, wherein the instructions are further executable to perform frequency error correction while time-tracking the synchronization source.

29. The wireless device of claim 18, wherein sending the network information comprises gradually decreasing power and then gradually increasing the power to mimic a deep fade.

30. The wireless device of claim 18, wherein sending the network information comprises simultaneously transmitting a common reference signal to the wireless communication device while achieving self synchronization using a primary synchronization signal on the last two orthogonal frequency division multiplexing symbols of a slot.

31. The wireless device of claim 18, wherein sending the network information comprises simultaneously transmitting a common reference signal to the wireless communication device while achieving self synchronization using a secondary synchronization signal on the last two orthogonal frequency division multiplexing symbols of a slot.

32. The wireless device of claim 18, wherein the period of silence is coordinated by a network.

33. A wireless device configured for self synchronization, comprising:
a processor;
memory in electronic communication with the processor;
instructions stored in the memory, the instructions being executable by the processor to:
send network information to a wireless communication device, wherein the network information indicates a first time period, wherein the first time period is a period of silence by the wireless device, wherein the network information comprises a multimedia broadcast single frequency network subframe declaration, and wherein the wireless device as a current stratum:
monitor synchronization signals during the first time period, wherein monitoring synchronization signals comprises not transmitting; and
transmit a common reference signal in subframes declared as multimedia broadcast single frequency network for a stratum greater the current stratum, wherein the subframes declared as multimedia broadcast single frequency network comprise a second time period.

34. A wireless device configured for self synchronization, comprising:
a processor;
memory in electronic communication with the processor;
instructions stored in the memory, the instructions being executable by the processor to:
send network information to a wireless communication device, wherein the network information indicates a first time period wherein the first time period is a period of silence by the wireless device, and wherein the wireless device as a current stratum; and
monitor synchronization signals during the first time period, wherein monitoring synchronization signals comprises not transmitting,
wherein the network information comprises scheduling information, and wherein the scheduling information comprises no scheduled transmissions to the wireless communication device in and around subframes where no common reference signal is transmitted.

35. A wireless device configured for self synchronization, comprising:
means for sending network information to a wireless communication device, wherein the network information indicates a first time period, wherein the first time period is a period of silence by the wireless device and wherein the wireless device has a current stratum; and
means for monitoring synchronization signals during the first time period, wherein monitoring synchronization signals comprises not transmitting; and
means for transmitting synchronization signals in a second time period, wherein the second time period comprises slots designated for base stations having a stratum less than or equal to the current stratum to transmit synchronization signals.

36. The wireless device of claim 35, wherein the first time period comprises slots designated for base stations having a stratum less than or equal to the current stratum to monitor synchronization signals.

37. The wireless device of claim 35, wherein the network information comprises a multimedia broadcast single frequency network subframe declaration.

38. A computer-program product for self synchronization by a base station, the computer-program product comprising a non-transitory computer-readable medium having instructions thereon, the instructions comprising:
   code for sending network information by the base station to a wireless communication device, wherein the network information indicates a first time period, wherein the first time period is a period of silence by the base station, and wherein the base station has a current stratum; and
   code for monitoring, by the base station, synchronization signals during the first time period, wherein monitoring synchronization signals comprises not transmitting:, and
   code for transmitting, by the base station, synchronization signals in a second time period, wherein the second time period comprises slots designated for base stations having a stratum less than or equal to the current stratum to transmit synchronization signals.

39. The computer-program product of claim 38, wherein the first time period comprises slots designated for base stations having a stratum less than or equal to the current stratum to monitor synchronization signals.

40. The computer-program product of claim 38, wherein the network information comprises a multimedia broadcast single frequency network (MBSFN) subframe declaration.

* * * * *